United States Patent

Laurich et al.

[11] Patent Number: 5,922,450
[45] Date of Patent: Jul. 13, 1999

[54] RUBBERY POLYMERS WITH IMPROVED COLOR STABILITY

[75] Inventors: Jaclyn Beth Laurich, Tallmadge; Gary Lee Burroway, Doylestown; James Walter Horvath, Cuyahoga Falls, all of Ohio

[73] Assignee: The Goodyear Tire & Rubber Company, Akron, Ohio

[21] Appl. No.: 09/014,743

[22] Filed: Jan. 28, 1998

Related U.S. Application Data

[62] Division of application No. 08/895,652, Jul. 17, 1997, Pat. No. 5,753,772.

[51] Int. Cl.$^6$ .................................................... B32B 27/00
[52] U.S. Cl. ................................................ 428/319.9
[58] Field of Search ............................... 428/319.9

[56] References Cited

U.S. PATENT DOCUMENTS

| | | | |
|---|---|---|---|
| 2,414,803 | 1/1947 | D'Alelio | 526/329.1 |
| 3,198,854 | 8/1965 | Warner | 526/329.1 |
| 3,354,238 | 11/1967 | Schmitt et al. | 526/329.1 |
| 3,400,175 | 9/1968 | Firestone et al. | 526/329.1 |
| 3,792,125 | 2/1974 | Wefer | 526/329.1 |
| 4,000,359 | 12/1976 | Watts et al. | 526/329.1 |
| 4,229,549 | 10/1980 | Usami et al. | 526/329.1 |
| 4,268,549 | 5/1981 | Fink et al. | 526/329.1 |
| 4,319,015 | 3/1982 | Strüver et al. | 526/329.1 |
| 5,380,785 | 1/1995 | Nqoc et al. . | |

FOREIGN PATENT DOCUMENTS

| | | | |
|---|---|---|---|
| 5254689 | 5/1977 | Japan | 526/329.1 |
| 6094413 | 5/1985 | Japan | 526/329.1 |

OTHER PUBLICATIONS

Journal of Polymer Science, Polymer Chemistry Edition No. 12 vol. 15 (1977) pp. 3079–3081.

*Primary Examiner*—Bernard Lipman
*Assistant Examiner*—N. Sarofim
*Attorney, Agent, or Firm*—Alvin T Rockhill

[57] ABSTRACT

There is a need for colorers which are utilized in automotive interiors which offer good color stability as well as a high level of Neat and ultraviolet light resistance. It is particularly critical for polymers which are utilized in making skin compounds for automotive instrument and door panels to have excellent color stability as well as excellent heat and ultraviolet light resistance. This invention discloses a rubbery polymer which can be blended with polyvinyl chloride to make leathery compositions having good color stability, heat resistance and ultraviolet light resistance, said rubbery polymer being comprised of repeat units which are derived from (a) butyl acryylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a conjugated diene monomer and (f) a crosslinking agent; wherein the repeat units which are derived from the conjugated diene monomer are epoxidized. Such leathery compositions offer an excellent combination of properties for utilization in making skin compounds for panels used in automotive applications.

16 Claims, No Drawings

RUBBERY POLYMERS WITH IMPROVED COLOR STABILITY

This is a Divisional of application Ser. No. 08/895,652, filed on Jul. 17, 1997, U.S. Pat. No. 5,753,772.

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with a nitrile rubber (NBR). The nitrile rubber is included in such blends as a permanent modifier for the PVC which provides it with a higher degree of flexibility.

The automotive industry is currently moving toward more aerodynamic body designs. These new aerodynamic designs typically include larger glass surface areas. Such design changes have significantly increased the heat and ultraviolet light aging requirements of automotive interiors. This has, in turn, significantly increased the demands put upon polymers utilized as skins in automotive interior panels.

Heat and light stabilizers can be employed to improve the heat and ultraviolet light aging characteristics of conventional PVC/NBR blends which are utilized as skins for automotive interior panels. However, the degree to which the aging characteristics of such blends can be improved by the addition of additives is limited. In fact, there is a demand for performance characteristics in such applications which cannot be realized by the utilization of heat and light stabilizers alone. For instance, it would be highly desirable for the skins used in automotive panels to resist discoloration and cracking under conditions of high heat and intense ultraviolet light throughout the life of the vehicle.

NBR/PVC blends offer an array of physical properties making them useful as a skin composition for automotive panels. The NBR acts as a permanent flexibilizing monomer for the PVC. It also acts as a shrinkage control agent, and embossing aid, and improves grain retention. The NBR in such blends further provides vacuum-forming gauge control and exhibits low fog characteristics. NSPR is highly compatible with PVC and has the capability of being recycled. It is essential for any polymer that is substituted for NBR to display these essential characteristics.

U.S. Pat. No. 5,380,785 discloses rubbery polymer which can be blended with polyvinyl chloride to make leathery compositions having good heat and ultraviolet light resistance, said rubbery polymer being comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent. However, it would be highly desirable to increase the color stability of such rubbery polymers.

SUMMARY OF THE INVENTION

The present invention relates to a rubbery polymer that can be blended with PVC to make leathery compositions. These compositions are particularly useful in manufacturing skins for automotive interior panels. Skin compositions that are made utilizing this rubbery polymer provide a higher level of resistance to heat and ultraviolet light than those made utilizing conventional NBR/PVC blends. They also offer greatly improved color stability. The rubbery polymers of this invention also offer low fog characteristics, low odor, shrinkage control and grain retention. They also act as an embossing aid and as a permanent flexibilizing modifier. The rubbery polymers of this invention also have characteristics that make them useful in building gasket applications.

This invention more specifically discloses a rubbery polymer which can be blended with polyvinyl chloride to make leathery compositions having good color stability, heat resistance and ultraviolet light resistance, said rubbery polymer being comprised of repeat units which are derived from (a) butyl acrylate, or optionally a mixture of butyl acrylate and 2-ethylhexyl acrylate containing up to about 40 percent 2-ethyihexyl acrylate, (b) at least one member selected from the group consisting of methyl methacrylate, ethyl methacrylate, methyl acrylate and ethyl acrylate, (c) acrylonitrile, (d) styrene, (e) a conjugated diene monomer and (f) a crosslinking agent; wherein the repeat units which are derived from the conjugated diene monomer are epoxidized.

The subject invention further reveals a process for preparing a rubbery polymer which can be blended with polyvinyl chloride to make leathery compositions having improved color stability as well as good heat and ultraviolet light resistance, said process comprising the steps of (1) polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) a conjugated diolefin monomer and (e) a crosslinking agent under emulsion polymerization conditions to produce a seed polymer containing latex; (2) adding (a) styrene, (b) additional acrylonitrile, (c) additional conjugated diolefin monomer and (d) additional crosslinking agent to the seed polymer containing latex under emulsion polymerization conditions which result in the formation of an emulsion containing the rubbery polymer; (3) epoxidizing the rubbery polymer; and (4) recovering the rubbery polymer from the emulsion containing the rubbery polymer.

The subject invention further reveals a process for preparing a rubbery polymer which can be blended with polyvinyl chloride to make leathery compositions having improved tensile properties as well as good heat and ultraviolet light resistance, said process comprising the steps of (1) polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) a conjugated diolefin monomer and (e) a crosslinking agent under emulsion polymerization conditions to produce a seed polymer containing latex; (2) adding (a) styrene, (b) additional acrylonitrile, (c) additional conjugated diolefin monomer and (d) additional crosslinking agent to the seed polymer containing latex under emulsion polymerization conditions which result in the formation of an emulsion containing the rubbery polymer; (3) ozonating the rubbery polyner; and (4) recovering the rubbery polymer from the emulsion containing the rubbery polymer.

The present invention also discloses a leathery composition which is useful in automotive applications which is comprised of (1) polyvinyl chloride, (2) a plasticizer and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a conjugated diolefin monomer and (f) a crosslinking agent, wherein the rubbery polymer is epoxidized.

The subject invention further reveals a panel for automotive applications which is comprised of a semirigid urethane foam which is supported by a rigid backing, wherein said semirigid urethane foam is covered with a leathery skin which is comprised of (1) polyvinyl chloride, (2) a plasticizer and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a conjugated diolefin monomer and (f) a crosslinking agent, wherein said rubbery polymer is epoxidized.

The present invention also discloses a leathery composition which is useful in automotive applications which is comprised of (1) polyvinyl chloride, (2) a plasticizer and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a conjugated diolefin monomer and (f) a crosslinking agent, wherein the rubbery polymer is ozonated.

The subject invention further reveals a panel for automotive applications which is comprised of a semirigid urethane foam which is supported by a rigid backing, wherein said semirigid urethane foam is covered with a leathery skin which is comprised of (1) polyvinyl chloride, (2) a plasticizer and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a conjugated diolefin monomer and (f) a crosslinking agent, wherein said rubbery polymer is ozonated.

DETAILED DESCRIPTION OF THE INVENTION

The rubbery polymers of this invention are synthesized utilizing a free radical emulsion polymerization technique. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, (e) a conjugated diolefin monomer and (f) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, the rubbery polymers of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, (e) a conjugated diolefin monomer and (f) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units that are derived from those monomers.

The rubbery polymers of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 3 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene, (e) from about 4 weight percent to about 20 weight percent of a conjugated diolefin monomer and (f) from about 0.25 weight percent to about 8 weight percent of a crosslinking agent.

Such rubbery polymers will preferably contain (a) from about 50 weight percent to about 77 weight percent butyl acrylate, or optionally a mixture of butyl acrylate and 2-ethylhexyl acrylate containing up to about 40 percent 2-ethylhexyl acrylate, (b) from about 5 weight percent to about 25 weight percent of at least one member selected from the group consisting of methyl methacrylate, ethyl methacrylate, methyl acrylate and ethyl acrylate, (c) from about 5 weight percent to about 30 weight percent acrylonitrile, (d) from about 5 weight percent to about 18 weight percent styrene, (e) from about 6 weight percent to about 16 weight percent of a conjugated diolefin monomer and (f) from about 0.5 weight percent to about 4 weight percent of a crosslinking agent.

The rubbery polymers of this invention will more preferably be comprised of repeat units which are derived from (a) about 55 weight percent to about 75 weight percent butyl acrylate, or optionally a mixture of butyl acrylate and 2-ethylhexyl acrylate containing up to about 40 percent 2-ethylhexyl acrylate, (b) about 5 weight percent to about 20 weight percent of at least one member selected from the group consisting of methyl methacrylate, ethyl methacrylate, methyl acrylate and ethyl acrylate, (c) about 6 weight percent to about 20 weight percent acrylonitrile, (d) about 6 weight percent to about 14 weight percent styrene, (e) about 7 weight percent to about 14 weight percent of a conjugated diolefin monomer and (f) about 1 weight percent to about 3 weight percent of a crosslinking agent. The percentages reported in this paragraph are based upon the total weight of the rubbery polymer.

The rubbery polymers of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent and a soap. It is often preferred to utilize a metal salt of an alkyl sulfonate or a metal salt of an alkyl sulfate as the soap. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.005 phm (parts per hundred parts of monomer by weight) to about 1 phm of at least one member selected from the group consisting of metal salts of alkyl sulfates and metal salts of alkyl sulfonates. It is generally preferred for the reaction mixture to contain from about 0.008 phm to about 0.5 phm of the metal salt of the alkyl sulfonate or the metal salt of the alkyl sulfate. It is normally more preferred for the reaction mixture to contain from about 0.05 phm to about 0.3 phm of the metal salt of the alkyl sulfonate or the metal salt of the alkyl sulfate.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butyl-peroxy)butane, and the like. Water-soluble peroxygen-free radical initiators are especially useful in such aqueous polymverizations.

The emulsion polymerizations of this invention are typically carried out at the eemperature which is within the range of about 10° C. about 95° C. At temperatures above about 88° C., alkyi acrylate monomers (such as butyl acrylate) have a tendency to boil. Thus, a pressurized jacket would be required for heating such alkyl acrylate monomers to temperatures in excess of about 80° C. Thus, in most cases, the polymerization temperature utilized will vary between about 20° C. and about 80° C. On the other hand, at polymerization temperatures of less than about 55° C., a redox initiator system is required to insure satisfactory polymerization rates.

The sulfonate surfactants that are useful in this invention are commercially available from a wide variety of sources. For instance, Du Pont sells sodium alkylarylsulfonate under the tradename Alkanol™, Browning Chemical Corporation sells sodium dodecylbenzene sulfonates under she tradename Ufaryl™ Dl-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

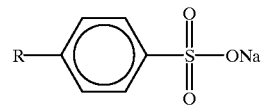

wherein R represents an alkyl group containing from 1 to about 20 carbon atoms. It is preferred for the alkyl group to contain from about 8 to about 14 carbon atoms.

The polymerization is carried out as a two-step batch process. In the first stec, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) a conjugated diolefin monomer and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 1 to about 35 weight percent methyl methacrylate, ethyl methacrylate, methyl acrylate or ethyl acrylate, from about 2 to about 30 weight percent acrylonitrile, from about 2 to about 30 weight percent of a conjugated diolefin monomer and from about 0.25 weight percent to 6 weight percent of the crosslinking agent. It is typically preferred for the monomeric component utilized in the first step to include about 50 weight percent to about 85 weight percent butyl acrylate or optionally a mixture of butyl acrylate and 2-ethylhexyl acrylate containing up to about 40 percent 2-ethylhexyl acrylate, from about 2 weight percent to about 20 weight percent ethyl acrylate, ethyl methacrylate, methyl acrylate or methyl methacrylate, from about 4 weight percent to about 28 weight percent acrylonitrile, from about 4 weight percent to about 25 weight percent of a conjugated diolefin monomer and from about 0.25 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 3 weight percent to about 20 weight percent methyl methacrylate, ethyl methacrylate, methyl acrylate or ethyl acrylate, from about 5 weight percent to about 20 weight percent acrylonitrile, from about 6 weight percent to about 20 weight percent of a conjugated diolefin monomer and from about 0.25 weight percent to about 2 weight percent crosslinking agent.

After the seed polymer latex has been prepared, styrene monomer, additional acrylonitrile monomer, additional conjugated diolefin monomer and additional crosslinking agent is added to the seed polymer containing latex. As a general rule, from about 5 parts by weight to about 80 parts by weight of styrene, from about 5 part by weight to about 50 parts by weight of additional acrylonitrile, from about 2 parts by weight to about 40 parts by weight of additional conjugated diolefin monomer and from about 0.25 to 15 parts by weight of the crosslinking agent will be added. In this second stage of the polymerization, it is preferred to add from about 20 parts by weight to about 75 parts by weight of styrene, from about 15 parts by weight to about 40 parts by weight of acrylonitrile, from about 4 parts by weight to about 30 parts by weight of conjugated diolefin monomer and from about 1 part by weight to 10 part by weight of the crosslinking agent. It is typically more preferred for from about 50 parts by weight to about 70 parts by weight of styrene, from about 20 parts by weight to about 35 parts by weight of acrylonitrile, from about 5 parts by weight to about 20 parts by weight of conjugated diolefin monomer and from about 3 parts by weight to about 7 parts by weight of the crosslinking agent to be added to the seed polymer latex to initiate the second phase of the polymerization.

A wide variety of crosslinking agents can be utilized in carrying out the polymerizations of this invention. Some representative examples of crosslinking agents that can be utilized include difunctional acrylates, difunctional methacrylates, trifunctional acrylates, trifunctional methacrylates and divinylbenzene. The crosslinking agent proven to be particularly useful is 1,4-butanediol dimethacrylate. The conjugated diolefin monomers that can be employed will typically contain from 4 to about 8 carbon atoms. Isoprene and 1,3-butadiene are preferred conjugated diolefin monomers with 1,3-butadiene being the most preferred.

In most cases, the polyme-rization will be continued until a high monomer conversion has been attained. After the polymerization has been completed, the rubbery polymer will be epoxidized to improve color stability or ozonated to improve tensile properties. The rubbery polymer can, of course, be both epoxidized and ozonated to improve both of these characteristics. In any case, the rubbery polymer is epoxidized and/or ozonated while it is still in the emulsion.

The rubbery polymer can be epoxidized by simply adding a peracid, such as perbenzoic acid or performic acid, to the latex containing the rubbery polymer. To insure that all of the double bonds in the rubbery polymer undergo epoxidation, an excess of the peracid will normally be added. It should be noted that one mole of double bonds will be present in the rubbery polymer for every mole of conjugated diolefin monomer employed in its synthesis.

It is normally convenient to form the peracid in situ in the latex of the rubbery polymer. For instance, performic acid (methaneperoxoic acid) can be generated in situ in the latex by reacting formic acid with hydrogen peroxide. This reaction will typically be conducted in the presence of acetic acid which acts as a catalyst. Thus, the epoxidation can conveniently be done by adding formic acid, hydrogen peroxide and acetic acid to the latex of the rubbery polymer. The epoxidation of the rubbery polymer will typically be carried out at a temperature which is within the range of about 70° F. (21° C.) to about 140° F. (60° C.). It is normally preferred for the epoxidation to conducted at a temperature which is within the range of about 90° F. (32° C.) to about 130° F. (54° C.) with it being most preferred for the epoxidation to be conducted at a temperature which is within the range of about 110° F. (430° C.) to about 120° F. (490° C.)

The rubbery polymer can be ozonated by simply mixing ozone into the latex of the rubbery polymer for a period of time which is sufficient to attain the desired results. This can be accomplished by bubbling ozone through the latex. It can also be done by rapidly agitating the latex under an ozone containing atmosphere. It may be desirable for the ozone containing atmosphere to be under pressure. Other techniques for mixing ozone throughout the latex being treated can also be employed in practicing the present invention.

The temperature at which this treatment procedure is carried out is not critical. In fact, virtually any temperature between the freezing point of the latex and its boiling point can be utilized. However, for practical reasons, the latex will normally be treated with ozone at a temperature which is within the range of about 0° C. to about 60° C. A temperature within the range of about 15° C. to about 30° C. will most preferably be employed. Higher temperatures can result in reduced solubility of the ozone in the latex even though faster reaction rates may be attained. The ozone treatment will be carried out for a time which is sufficient to ozonate a sufficient number of double bonds in the polymer to attain the tensile properties which are desired. The treatment time employed will typically be within the range of about 15 minutes to about 6 hours. The period of time utilized in treating the latex with ozone will more typically be within the range of about 30 minutes to about 2 hours.

The reaction through which ozone cleaves the double bonds in the rubbery polymer can be depicted as follows:

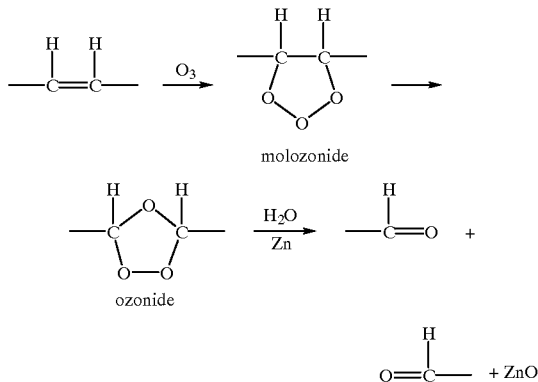

In the absence of zinc, hydrogen peroxide is formed which may degrade the carbonyl products formed by oxidation. In such a scenario, the hydrogen peroxide reacts with the aldehydes produced by ozonylsis and converts them to carboxylic acids. A more detailed description of ozonolysis is provided by J March, *Advanced Organic Chemistry: Reactions, Mechanisms and Structure*; pages 871–874 (McGraw-Hill Book Company, 1968) and by R T Morrison and R N Boyd, *Organic Chemistry; Third Edition*; pages 218–219 (Allyn and Bacon, Inc., 1973).

If the ozonylsis is carried out in the absence of zinc, carboxyl groups will typically be formed. As the amount of carboxyl groups on the polymer increases, the pH of the emulsion decreases. The extent to which double bonds in the polymer have been cleaved can accordingly be monitored by monitoring the pH of the emulsion.

After the epoxidation and/or ozonylsis step has been completed, it is normally desirable to add an aminoalcohol to the emulsion to deodorize the latex.

The aminoalcohol will generally be of the structural formula $HO-A-NH_2$ wherein A represents an alkylene group which contains from 2 to about 20 carbon atoms. It is normally preferred for the aminoalcohol to contain from 2 to about 10 carbon atoms with amino alcohols which contain from 2 to about 5 carbon atoms being most preferred. Ethanolamine ($HO-CH_2-CH_2-NH_2$) which is also known as 2-aminoethanol and 2-hydroxyethylamine is a representative example of a highly preferred aminoalcohol. Some additional examples of preferred aminoalcohols include 3-aminopropanol, 4-aminobutanol, 2-amino-2-methyl-1-propanol, 2-amino-2-ethyl-1,3-propanediol, N-methyl-2,2-iminoethanol and 5-aminopentanol.

This deodorizing step will be carried out under conditions which allow for the aminoalcohol to react with residual n-butylacrylate and acrylonitrile which is present in the emulsion. This reaction will proceed over a broad temperature range and the deodorizing step can be conducted at any temperature which is within the range of about 5° C. and about 95° C. However, for practical reasons, the deodorizing step will normally be carried out at a temperature which is within the range of about 20° C. to about 70° C. Since the reaction is faster at higher temperatures, the amount of reaction time needed will decrease with increasing temperature. For instance, at a temperature of about 20° C., a residence time in the deodorizing step of one to three days may be required. On the other hand, at a temperature of about 65° C., only about two hours of reaction time is normally required.

The amount of time required for the aminoalcohol to react with the residual n-butylacrylate monomer and residual acrylonitrile monomer will also depend upon the level of aminoalcohol utilized. As a general rule, from about 0.05 weight percent to about 2 weight percent of the aminoalcohol will be added, based upon the total weight of the emulsion. More typically from about 0.1 weight percent to about 1.5 weight percent of the aminoalcohol will be added. It is normally preferred to utilize from about 0.3 weight percent to about 1 weight percent of the aminoalcohol.

The rubbery polymer is recovered from the emulsion (latex) after the optional deodorizing step. This can be accomplished by utilizing standard coagulation techniques. For instance, coagulation can be accomplished by the addition of salts, acids or both to the latex.

After the rubbery polymer is recovered by coagulation, it can be washed to further reduce odors. This can be accomplished by simply pouring or spraying water on the rubbery polymer. The rubbery polymer can also be washed in a water bath. Such a washing step will, of course, further reduce the level of any odor. After being washed, the rubbery polymer is generally dried.

It is sometimes advantageous to convert the dry rubbery polymer into a powder to facilitate its usage. In this case, it will be beneficial to add a partitioning agent to the rubbery polymer. Some representative examples of partitioning agents that can be employed include calcium carbonate, emulsion polyvinyl chloride and silica. Calcium carbonate is a highly desirable partitioning agent that can be utilized in such applications.

The rubbery polymers of this invention can be blended with polyvinylchloride to make leather-like compositions. These leathery compositions offer an excellent combination of properties for utilization in making skin compounds for panels used in automotive applications. These leathery compositions can be prepared by blending the rubbery polymer into polyvinylchloride (PVC) utilizing standard mixing techniques. It is highly preferred for the rubbery polymer to be in powdered form when blended into PVC to make such leathery compositions.

A wide variety of plasticizers that are compatible with the polyvinyl chloride resins can be employed. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, $C_{7-9}$ linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, low temperature plasticizer, diisooctyl azelate; benzoic acid derivatives such as diethylene glycol dibenzoate, dipropylene glycol dibenzoate, diethylene glycol benzoate and dipropylene glycol benzoate blend, proprietary low stain, neopentyl glycol dibenzoate, glyceryl tribenzoate, timethylolethane tribenzoate, pentaerythritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, epoxy-type plasticizer, epoxy-type plasticizer tallate, alkyl epoxy stearate, epoxidized butyl ester, epoxidized octyl tallage, epoxidized soybean oil, epoxidized triglyceride, epoxidized soya bean oil, epoxidized sunflower oil, epoxidized-type plasticizer, epoxidized linseed oil, epoxidized tallate ester, 2-ethylhexyl-epoxy tallate, octyl epoxy stearate; proprietary esters such as proprietary ester and mixed ester; ether derivatives, such as cumylphenyl benzyl ether; formal derivatives such as 2-(2-butoxyethoxy)ethanal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethyl butyrate), triethylene glycol di-caprylate-caprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctyl isophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitates such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri($C_{7-9}$ alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl phosphate, tributoxyethyl phosphate, triphenyl phosphate, cresyl diphenyl phosphate, tricresyl phosphate, triisopropylphenyl phosphate, alkyl aryl phosphates, diphenylxylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl ISO-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetone stearate, butyl acetoxy stearate, methylpentachlorostearate, and methoxylethyl acetoxy stearate; sucrose derivatives such as sucrose benzoate; sulfonic acid derivatives such as alkyl-sulfonic esters of phenol; tall oil derivatives such as methylester of tall oil and isooctyl ester of tall oil; and terephthalic acid derivatives such as dioctyl terephthalate.

Such leathery compositions typically contain from about 40 to 160 parts by weight of the rubbery polymer, from about 10 to about 50 parts of a plasticizer and from about 0.1 to about 5 parts by weight of an antidegradant per 100 parts by weight of the polyvinylchloride. It is typically preferred for such leathery compositions to contain from about 60 to about 120 parts by weight of the rubbery polymer, from about 15 to about 40 parts of the plasticizer and from about 0.5 to 3 parts of an antidegradant (per 100 parts of the PVC). It is typically more preferred for the leathery composition to contain from about 70 to about 90 parts by weight of the rubbery polymer, from about 20 to about 30 parts by weight of the plasticizer and from about 1 to 2 parts by weight of the antidegradant per 100 parts by weight of the PVC.

Such compositions will also generally contain an acrylonitrile-butadiene-styrene resin (ABS resin). The leathery composition will typically contain from about 15 parts to about 80 parts of ABS resin per 100 parts of PVC. The leathery composition will preferably contain from about 25 to about 55 parts per weight of the ABS resin per 100 parts by weight of the PVC. It is generally more preferred for the leathery composition to contain from about 30 to about 40 parts by weight of the ABS resin per 100 parts by weight of PVC. Various colorants and/or pigments will typically also be added to the composition to attain a desired color.

The leathery compositions of this invention are useful in a wide variety of applications. For example, they have been found to be extremely valuable when used in making skins for automotive panels. Such panels are typically comprised of a semi-rigid urethane foam which is supported by a rigid backing and covered with the leathery composition of this invention. Such skins are made by calendering the leathery compositions of this invention and then cutting them to the desired size and shape. Such skins for automotive applications which are made with the leathery compositions of this invention offer outstanding heat and ultraviolet light stability. These are highly desirable characteristics which can help to prevent the skin of automotive panels from cracking during the normal life of the vehicle.

The rubbery polymers of this invention can also be blended with other halogen cont.aining polymers (in addition to PVC), styrenic polymers (polymers which contain styrene, such as acrylonitrile-styrene-acrylate (ASA) polymers), polyolefins and polyamides to produce compositions which exhibit good heat and ultraviolet light resistance. Such polymeric compositions can be used in manufacturing a wide variety of useful articles, such as profiles, moldings, sheeting, flooring, wall coverings, hose, cables, footwear, automotive instrument panels and automotive door panels. Virtually any type of polyamide (nylon) can be utilized in preparing such blends. These nylons are generally prepared by reacting diamines with dicarboxylic acids. The diamines and dicarboxylic acids which are utilized in preparing such nylons will generally contain from about 2 to about 12 carbon atoms. However, nylons that can be utilized in such blends can also be prepared by addition polymerization. Some representative examples of nylons which can be used include nylon-6,6, nylon-6, nylon-7, nylon-8, nylon-9, nylon-10, nylon-11, nylon-12 and nylon-6,12. These nylons will typically have a number average molecular weight which is within the range of about 8,000 to about 40,000 and will more typically have a number average molecular weight which is within the range of about 10,000 to about 25,000. Some representative examples of polyolefins that can be used include linear low density polyethylene, high density polyethylene, polypropylene, polybutylene and modified polyolefins, such as ethylene vinyl acetate (EVA).

This invention is illustrated by the following examples that are merely for the purpose of illustration and are not to be regarded as limiting the scope of this invention or the manner in which it can be practiced. Unless specifically indicated otherwise, all parts and percentages are given by weight.

EXAMPLE 1

In this experiment, a rubbery polymer was made utilizing the techniques of this invention. The polymerization was conducted in a reactor having a capacity of 10 gallons (37.85 liter). The reactor was equipped with two axially flow turbine agitators with baffles which were operated at 150 rpm (revolutions per minute).

A buffer solution was made by mixing 339 grams of a 25 percent aqueous solution of dodecylbenzenesulfonate, 56.5 grams of tetrasodium pyrophosphate and 33.9 grams of potassium persulfate into 16.96 kg of water. A first monomer solution was made by mixing 9.04 kg of butyl acrylate, 904 grams of acrylonitrile, 452 grams of methyl methacrylate, 226 grams of ethylene glycol dimethacrylate, 28.25 grams of tertiary-dodecyl mercaptan and 904 grams of 1,3-butadiene, and a second monomer solution was made by mixing 1.22 kg of styrene, 548 grams of acrylonitrile, 11.3 grams of tertiary-dodecyl mercaptan, 113 grams of a 55 percent solution of divinylbenzene and 226 grams of 1,3-butadiene.

The reactor was evacuated for 30 minutes and then the buffer solution was introduced into the reactor. The first monomer solution was then charged into the reactor and the polymerization medium was maintained at a temperature of 120° F. (490° C.). When the solids content of the latex reached 40 percent, the second monomer solution was charged into the reactor and the temperature of the polymerization medium was increased to 175° F. (80° C.). After the solids content reached 43–45 percent, the temperature was maintained at 175° F. (80° C.) for an additional 4 hours to insure that a high conversion had been attained.

A 2000-gram sample of the latex synthesized was subsequently epoxidized by slowly adding 15 grams of formic acid and 10 grams of acetic acid in 200 mls of water to the sample. Then, 70 grams of a 35 percent solution of hydrogen peroxide was stirred into the latex. The latex containing the formic acid, the acetic acid and the hydrogen peroxide was then put in a jug and placed in an oven at 110–120° F. (43–49° C.) for 3–4 hours. Then, 37 grams of Aquamix 192 antioxidant was added and the latex was coagulated. The rubbery polymer recovered was washed twice and dried. The rubbery polymer synthesized in this experiment contained about 10 percent bound butadiene monomer.

EXAMPLE 2

In this experiment, a rubbery polymer containing 8 percent bound butadiene was synthesized utilizing the technique of this invention. The procedure described in Example 1 was repeated in this experiment except that the amount of 1,3-butadiene employed in making the first monomer solution was decreased to 678 grams with the amount of butyl acrylate employed in making the first monomer solution being increased to 9.266 kg. The latex synthesized was also epoxidized and recovered utilizing the procedure described in Example 1.

EXAMPLE 3

In this experiment, a rubbery polymer containing 4 percent bound butadiene was synthesized utilizing the technique of this invention. The procedure described in Example 1 was repeated in this experiment except that the amount of 1,3-buLadiene employed in making the first monomer solution was decreased to 339 grams with the amount of butyl acrylate employed in making the first monomer solution being increased to 9.605 kg. In this experiment, the amount of 1,3-butadiene employed in making the second monomer solution was also decreased to 339 grams with the amount of butyl acrylate employed in making the second monomer solution being increased to 9.605 kg. The latex synthesized was also epoxidized and recovered utilizing the procedure described in Example 1.

The rubbery polymer sample was clear. In fact, the rubbery polymer had sufficient clarity to allow print having 6-point font to be read through a 0.125-inch (3.175 mm) thick sheet of said rubbery polymer. More specifically, the rubbery polymer had sufficient clarity to allow the word "clear" printed in black letters on a white background using 6-point type to be read through a 0.125-inch (3.175 mm) thick sheet of the rubber with the unaided eye under typical indoor illumination.

EXAMPLE 4

The rubbery polymer synthesized in Example 2 was compounded into a standard crash pad formulation and evaluated for color stability. It was also compared to a standard crash pad formulation made with a rubbery polymer having the same composition that had not been epoxidized. The light aging studies were conducted in a Q-U-V accelerated weathering tester that was equipped with a UVB-313 lamp. One aging cycle consisted of 6 hours of light and 4 hours of 100 percent humidity at 65° C. with continuous repeated cycles to a total of 500 hours. The crash pad formulation made utilizing the rubbery polymer synthesized in Example 2 showed a Delta E color change of only about 2.5. The crash pad formulation made utilizing the comparative polymer showed a Delta E color change of about 7. Thus, the crash pad formulation made utilizing the rubbery polymer of this invention showed much better color stability.

EXAMPLE 5

In this experiment, a rubbery polymer was synthesized utilizing the polymerization procedure described in Example 3. However, the latex made was ozonated rather than epoxidized. This was accomplished by simply introducing ozone into the latex sample. After the ozonalysis had been completed, the rubbery polymer samples were recovered and dried as described in Example 1.

Heat aging was conducted by the ASTM 573-78 air oven heat aging method with ASTM die C specimens. Tensile properties were determined before and after aging with a United Model FM30-DM1VA tensile tester at 20 inches per minute (50.8 cm/minutes) crosshead speed, 2.5 inch (6.35 cm) jaw separation and 1 inch (2.54 cm) benchmark. For comparative purpose, a sample of rubbery polymer made without incorporating a conjugated diolefin monomer therein was also evaluated. Since this comparative rubber did not contain double bonds, it was not ozonated.

| Elongation vs. Heat Aging Time | | |
| --- | --- | --- |
| Heat Aging Time | Ozonated Rubber | Comparative Rubber |
| Original | 158% | 89% |
| 70 hours | 181% | 121% |
| 144 hours | 157% | 116% |
| 288 hours | 147% | 127% |
| 384 hours | 143% | 124% |
| 480 hours | 115% | 70% |
| 528 hours | 125% | 98% |

As can be seen from the table above, the ozonated rubbery polymers had much better elongation characteristics than did their non-ozonated counterparts. This experiment accordingly shows that the ozonalysis technique of this invention can be used to improve the tensile properties of the rubbery polymers described herein.

While certain representative embodiments and details have been shown for the purpose of illustrating the subject invention, it will be apparent to those skilled in this art that various changes and modifications can be made therein without departing from the scope of the subject invention.

What is claimed is:

1. A panel for automotive applications which is comprised of a semirigid urethane foam which is supported by a rigid backing, wherein said semirigid urethane foam is covered with a leathery skin which is comprised of (1) polyvinyl chloride, (2) a plasticizer and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a conjugated diolefin monomer and (f) a crosslinking agent, wherein said rubbery polymer is ozonated.

2. A panel as specified in claim 1 wherein said leathery skin is comprised of about 40 to about 160 parts by weight of the rubbery polymer, from about 10 to about 50 parts by weight of the plasticizer and from about 0.1 to about 5 parts by weight antidegradants per 100 parts by weight of the polyvinylchloride.

3. A panel as specified in claim 2 wherein said leathery skin is further comprised of about 15 to about 80 parts by weight of an acrylonitrile-butadiene-styrene resin per 100 parts of the polyvinylchloride.

4. A panel as specified in claim 3 wherein the crosslinking agent is selected from the group consisting of difunctional acrylates, trifunctional acrylates, difunctional methacrylates, trifunctional methacrylates and divinylbenzene.

5. A panel as specified in claim 4 wherein said leathery skin contains from about 60 to about 120 parts by weight of the rubbery polymer, from about 15 to about 40 parts by weight of the plasticizer and from about 0.5 to 3 parts by weight antidegradants.

6. A panel as specified in claim 5 wherein said leathery skin contains from about 25 to about 55 parts by weight of the acrylonitrile-butadiene-styrene resin per 100 parts by weight of polyvinylchloride.

7. A panel as specified in claim 6 wherein said leathery skin is further comprised of a color imparting agent selected from the group consisting of colorants and pigments.

8. A panel as specified in claim 7 wherein the conjugated diolefin monomer is 1,3-butadiene.

9. A panel as specified in claim 8 wherein the member selected from the group consisting of methyl methacrylate, ethyl methacrylate, methyl acrylate and ethyl acrylate is methyl methacrylate.

10. A panel as specified in claim 9 wherein said leathery skin contains from about 70 to about 90 parts by weight of the rubbery polymer, from about 20 to about 30 parts by weight of the plasticizer and from about 1 to 2 parts by weight antidegradants per hundred parts by weight of the polyvinylchloride.

11. A panel as specified in claim 10 wherein the crosslinking agent is divinylbenzene.

12. A panel as specified in claim 11 wherein said leathery skin contains from about 25 to about 55 parts by weight of the acrylonitrile-butadiene-styrene resin per 100 parts by weight of polyvinylchloride.

13. A panel as specified in claim 10 wherein the crosslinking agent is a trifunctional acrylate.

14. A panel as specified in claim 11 wherein the crosslinking agent is a difunctional acrylate.

15. A panel as specified in claim 10 wherein the crosslinking agent is a difunctional methacrylate.

16. A panel as specified in claim 11 wherein the crosslinking agent is a trifunctional methacrylate.

* * * * *